US011055572B2

(12) United States Patent
Uchiyama

(10) Patent No.: US 11,055,572 B2
(45) Date of Patent: Jul. 6, 2021

(54) SYSTEM AND METHOD OF TRAINING AN APPEARANCE SIGNATURE EXTRACTOR

(71) Applicant: CANON KABUSHIKI KAISHA, Tokyo (JP)

(72) Inventor: Hiroyuki Uchiyama, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 16/283,583

(22) Filed: Feb. 22, 2019

(65) Prior Publication Data
US 2020/0272860 A1 Aug. 27, 2020

(51) Int. Cl.
*G06K 9/62* (2006.01)
*G06N 20/00* (2019.01)
*G06K 9/03* (2006.01)

(52) U.S. Cl.
CPC ............. *G06K 9/6262* (2013.01); *G06K 9/03* (2013.01); *G06K 9/6257* (2013.01); *G06N 20/00* (2019.01)

(58) Field of Classification Search
CPC .................. G06N 20/00; G06K 9/6257; G06K 9/6262–6264; G06K 9/03–036
See application file for complete search history.

(56) References Cited

U.S. PATENT DOCUMENTS

| | | | | |
|---|---|---|---|---|
| 2009/0023432 | A1* | 1/2009 | MacInnis | G06F 16/48 455/418 |
| 2015/0317389 | A1* | 11/2015 | Hua | G06F 16/951 706/12 |
| 2019/0147305 | A1* | 5/2019 | Lu | G06F 16/583 382/157 |
| 2019/0377949 | A1* | 12/2019 | Chen | G06K 9/00664 |

OTHER PUBLICATIONS

Sergey Rodionov, et al., Improving Deep Models of Person Re-identification for Cross-Dataset Usage, 14th International Conference on Artificial Intelligence Applications and Innovations, 2018; p. 75-84.
Yaniv Taigman, et al, DeepFace: Closing the Gap to Human-Level Performance in Face Verification, Sep. 25, 2014.
Jiang Wang, et al; Learning Fine-grained Image Similarity with Deep Ranking, The IEEE Conference on Computer Vision and Pattern Recognition (CVPR), 2014, pp. 1386-1393.

* cited by examiner

*Primary Examiner* — Casey L Kretzer
(74) *Attorney, Agent, or Firm* — Canon U.S.A., Inc. IP Division

(57) ABSTRACT

A system and method of training an appearance signature extractor using a training data set, the training data set including input images associated with a plurality of domains. The method comprises inputting an input image of the training data set, an identity label, and a domain label to the appearance signature extractor, the identity label providing identity information of the input image, and the domain label providing domain information of the input image, the domain information corresponding to one of the domains; determining an appearance signature from the input image using the appearance signature extractor; determining an identity score from the appearance signature; determining a loss value between the identity score and the identity label according to the domain label, wherein the loss value relates to an error between the identity score and the identity label; and updating the appearance signature extractor using the determined loss value.

10 Claims, 11 Drawing Sheets

SYSTEM AND METHOD OF TRAINING AN APPEARANCE SIGNATURE EXTRACTOR

TECHNICAL FIELD

The present description relates generally to image processing and, in particular, to the problem of training an appearance signature extractor using data of multiple domains.

BACKGROUND

Public venues such as shopping centres, parking lots and train stations are increasingly subject to surveillance using large-scale networks of video cameras. Application domains of large-scale video surveillance include security, safety, traffic management and business analytics.

A key task in many of these applications is rapid and robust object matching across multiple camera views. In one example, also called "hand-off", object matching is applied to persistently track multiple objects across a first and second camera with overlapping fields of view. In another example, also called "re-identification", object matching is applied to locate a specific object of interest across multiple cameras in the network with non-overlapping fields of view. In the following discussion, the term "object matching" generally relates to re-identification.

A camera captures an image at a time. An image is made up of visual elements. The terms "pixel", "pixel location" and "image location" are used interchangeably throughout this specification to refer to one of the visual elements in a captured image. Each pixel of an image is described by one or more values characterizing a property of the scene captured in the image. In one example, a single intensity value characterizes the brightness of the scene at the pixel location. In another example, a triplet of values characterise the colour of the scene at the pixel location. Furthermore, a "region", "image region" or "cell" in an image refers to a collection of one or more spatially adjacent visual elements.

A "bounding box" refers to a rectilinear image region enclosing an object in an image, that encompassing the object of interest, which the object of interest is usually a pedestrian in the application of video surveillance.

A common approach for object matching includes the steps of extracting an "appearance signature" for each object and using a model to compute a similarity between different objects. Throughout this description, the term "appearance signature" refers to a set of values summarizing the appearance of an object or region of an image, and will be understood to include the terms "appearance model", "feature descriptor" and "feature vector". The tools to perform this step are referred to as "extractor", "estimator" and "predictor". The steps of extracting the appearance signature are referred to as "extraction", "prediction" and "inference".

One commonly used tool to perform the step of extracting the appearance signature is using ANN (Artificial Neural Network). An artificial neural network includes a set of nodes, a set of weights and a set of edges, also referred to as connections. Each of the edges is weighted and connects two nodes of the network. The weighted edges are also referred to as weighted connections.

One type of artificial neural network is called CNN (Convolutional Neural Network). CNN (Convolutional Neural Network) arranges the ANN (Artificial Neural Network) nodes along with the weights into layers. Operators such as "convolve", "max pooling", "softmax", "ReLU", "batch normalization", "global average pooling" are applied to one layer and hence calculates the node values of the next layer. The first layer is the input to the CNN (Convolutional Neural Network), for example, the image data. Through each operator, the CNN (Convolutional Neural Network) calculates the node values of the next layer. The last layer is the output layer, which could be a set of values that is the appearance signature.

The following describes some of the operations that the CNN (Convolutional Neural Network) can perform.

Data processed by ANN (Artificial Neural Network) could be a multi-dimensional array. In mathematical terms, the multi-dimensional array is referred to as a "tensor". In particular, a 2-dimensional array is referred to 2nd-order tensor, and a 3-dimensional array is referred to 3rd-order tensor. For example, RGB image is a 3rd-order tensor of W×H×3.

Convolution is a commonly known filter operation, which is illustrated in FIG. 7. FIG. 7 shows a "conv3×3" operation, which means a 3×3 linear filter 710 that is being applied to a given two-dimensional layer 720. The application of the 3×3 linear filter 710 to the two-dimensional layer 720 results in the forming of a new two-dimensional layer 730.

For example, let I(x, y) be the two-dimensional layer 720 with coordinates (x, y), and let f(u, v) (u=−1,0,1, v=−1,0,1) be the "3×3 kernel" 710. The values of f(u,v) are also known as the "weights" of the kernel 710. The output of applying conv3×3 710 to the layer 720, denoted by (I*f) is determined according to Equation (1).

$$(I*f)(x, y) = \Sigma_{u=-1}^{1} I(x-u, y-v) f(u, v) \quad (1)$$

It is possible to have a convolution kernel of different sizes, other than 3×3, including non-square kernels. Further, convolution can be applied to a three-dimensional layer, for example shown by Equation (2).

$$(I*f)(x, y, z) = \Sigma_{u=-1}^{1} \Sigma_{v=-1}^{1} \Sigma_{w=1}^{C} I(x-u, y-v, w) f(u, v, w, z) \quad (2)$$

In Equation (2), the input three-dimensional layer has size W×H×C.

Maxpooling is a filter to shrink a two-dimensional layer. Assuming a filter of 2×2, the maxpooling operation would divide the two-dimensional layer into many adjacent 2×2 non-overlapping regions. An element with the maximum value in each region forms the element to the resultant two-dimensional layer. For the case of the 2×2 maxpooling filter, the resultant layer would have half of the size in each dimension as the input layer.

Global average pooling is a filter to shrink a tensor with W×H×C elements to a vector with C elements. An average value over a 1st and 2nd dimension plane forms the element to the resultant 1-dimensional vector.

A fully connected layer, commonly denoted by "fc", is a filter to apply linear operation. Let x(i), y(j) (i=1,2,3, . . . j=1,2,3, . . . ,J) be input and output vector, respectively. Let w(j,i), b(j) be weights and bias, respectively. The output y(j) is determined according to Equation (3)

$$y(j) = \Sigma_i w(j, i) \times x(i) + b(j) \quad (3)$$

The ANN (Artificial Neural Network) is trained using a set of input instances including associated ground-truth information. The training process iteratively updates trainable parameters in the ANN (Artificial Neural Network) to reduce the error between the actual output of the ANN (Artificial Neural Network) and the ground-truth information. The weights in the layers are a typical trainable parameter. For example in ANN (Artificial Neural Network) for re-identification, the ground-truth information could be an identity label of the object. The identity label could be an index integer value. The error between the output of the ANN (Artificial Neural Network) and the ground truth instances is referred to as a "loss value". Tools to obtain the loss value from the output of the ANN (Artificial Neural Network) are known as "loss functions". One commonly used method to update the trainable parameter is a "back propagation algorithm". A back propagation algorithm propagates the loss value from the output node to the input node backward through the network. The ANN (Artificial Neural Network) may be trained using one dataset prior to using another dataset. This process is commonly known as "pre-training". The pre-training provides better initial weights for the following training.

In machine learning, a "one-hot vector" is commonly used to represent a "class", a "category" or an "identity" of object. The one-hot vector is also referred to "one-hot representation" and "one-hot encoding". In the one-hot representation of an object belonging to a class A, out of C possible classes, the object will be represented with a C-dimensional vector with the vector element at the position A having a value of one and the rest of the vector elements having a value of zero.

The elements of the one-hot vector take zero or one. Instead of using a binary number, a floating point number could be used. In case that summation of all vector elements is normalized to a unit, the vector can be interpreted as a probability distribution. In this case, each vector element represents a probability that the object associated with this vector belongs to a class corresponding to the vector element index.

One commonly used loss function for re-identification is "classification loss" or "identification loss". First, the ANN (Artificial Neural Network) extracts the appearance signature from the input image. Then, an object identity classifier predicts the identity of the object from the appearance signature. The predicted identity is a vector which represents a probability of identity. Finally, the predicted identity is compared with the ground truth of identity label in order to compute a loss value. The ground truth of identity label may be an integer index value or a one-hot vector that represent the object identity. The comparison is performed by using "cross entropy" which computes dissimilarity between probability distributions.

Large sets of training data may contain data from multiple domains. The domain refers to a condition under which the data is acquired. For example, the domain could be information about place, time, weather, environment, event, lighting, and acquisition (image capture) equipment. However, in the case that training data includes multiple domains, the classification loss could train the ANN (Artificial Neural Network) so that the ANN (Artificial Neural Network) learns to distinguish identity by distinguishing the domains. For example, suppose a case that background texture of two domains are different, and the object is a person. The ANN (Artificial Neural Network) could learn to distinguish background texture instead of distinguishing the appearance of the person (e.g. type of clothing, accessories). The ANN (Artificial Neural Network) for extracting the appearance signature can learn a representation that ANN (Artificial Neural Network) for classifying identity can easily distinguish the domains. Using domain information by an ANN (Artificial Neural Network) degrades performance for re-identification of an object.

SUMMARY

The present description provides a method and system for training an appearance signature extractor using a set of training data including multiple domains in the context of re-identification.

It is an object of the present invention to substantially overcome, or at least ameliorate, one or more disadvantages of existing arrangements.

One aspect of the present invention provides a method of training an appearance signature extractor using a training data set, the training data set including input images associated with a plurality of domains, the method comprising: inputting an input image of the training data set, an identity label, and a domain label to the appearance signature extractor, wherein the identity label provides identity information of the input image, and the domain label provides domain information of the input image, the domain information corresponding to one of the plurality of domains; determining an appearance signature from the input image using the appearance signature extractor; determining an identity score from the appearance signature; determining a loss value between the identity score and the identity label according to the domain label, wherein the loss value relates to an error between the identity score and the identity label; and updating the appearance signature extractor using the determined loss value.

In one aspect, determining the loss value comprises determining a loss value for each domain of the plurality of domains from the identity score and the identity label; and selecting one of the loss values according to the domain label.

In one aspect, the method further comprises determining an identity score of the input image for each domain of the plurality of domains.

In one aspect, the method further comprises: determining an identity score for each of the plurality of domains from the appearance signature; and determining a combined identity score by combining the identity score for each of the plurality of domains.

In one aspect, the domain label contains information a location of the input image.

In one aspect, a secondary identity label is determined using the identity label and the domain label, and the loss value is determined according to the secondary identity label.

In one aspect, the method further comprises determining an appearance signature for the input image for each of the plurality of domains, and concatenating the determined appearance signatures.

In one aspect, determining the loss value comprises using the domain label to select one of a plurality of loss values.

In one aspect, determining the loss value comprises determining an inner product of a vector of the domain label and a vector representing a loss value associated with the identity score.

In one aspect, the method further comprises determining an identity score for each of the plurality of domains from the appearance signature; and determining a combined identity score by combining the identity score for each of the plurality of domains; determining the loss value from the combined identity score and a secondary identity label, wherein the secondary identity label is determined using the identity label and the domain label.

In one aspect, the domain label contains information relating to acquisition equipment used to capture the input image.

In one aspect, the domain label contains information relating to one of place, time, weather environment and event associated with the input image.

Another aspect of the present invention provides a non-transitory computer readable medium having a computer program stored thereon to implement a method of training an appearance signature extractor using a training data set, the training data set including input images associated with a plurality of domains, the program comprising: code for inputting an input image of the training data set, an identity label, and a domain label to the appearance signature extractor, wherein the identity label provides identity information of the input image, and the domain label provides domain information of the input image, the domain information corresponding to one of the plurality of domains; code for determining an appearance signature from the input image using the appearance signature extractor; code for determining an identity score from the appearance signature; code for determining a loss value between the identity score and the identity label according to the domain label, wherein the loss value relates to an error between the identity score and the identity label; and code for updating the appearance signature extractor using the determined loss value.

Another aspect of the present invention provides a system, comprising: a memory; and a processor, wherein the processor is configured to execute code stored on the memory for implementing a method of training an appearance signature extractor using a training data set, the training data set including input images associated with a plurality of domains, the method comprising: inputting an input image of the training data set, an identity label, and a domain label to the appearance signature extractor, wherein the identity label provides identity information of the input image, and the domain label provides domain information of the input image, the domain information corresponding to one of the plurality of domains; determining an appearance signature from the input image using the appearance signature extractor; determining an identity score from the appearance signature; determining a loss value between the identity score and the identity label according to the domain label, wherein the loss value relates to an error between the identity score and the identity label; and updating the appearance signature extractor using the determined loss value.

Another aspect of the present disclosure provides apparatus comprising: a memory; a processor configured to execute code stored on the memory implement a method of training an appearance signature extractor using a training data set, the training data set including input images associated with a plurality of domains, the method comprising: inputting an input image of the training data set, an identity label, and a domain label to the appearance signature extractor, wherein the identity label provides identity information of the input image, and the domain label provides domain information of the input image, the domain information corresponding to one of the plurality of domains; determining an appearance signature from the input image using the appearance signature extractor; determining an identity score from the appearance signature; determining a loss value between the identity score and the identity label according to the domain label, wherein the loss value relates to an error between the identity score and the identity label; and updating the appearance signature extractor using the determined loss value.

BRIEF DESCRIPTION OF THE DRAWINGS

One or more example embodiments of the invention will now be described with reference to the following drawings, in which.

DETAILED DESCRIPTION INCLUDING BEST MODE

Figure 1:
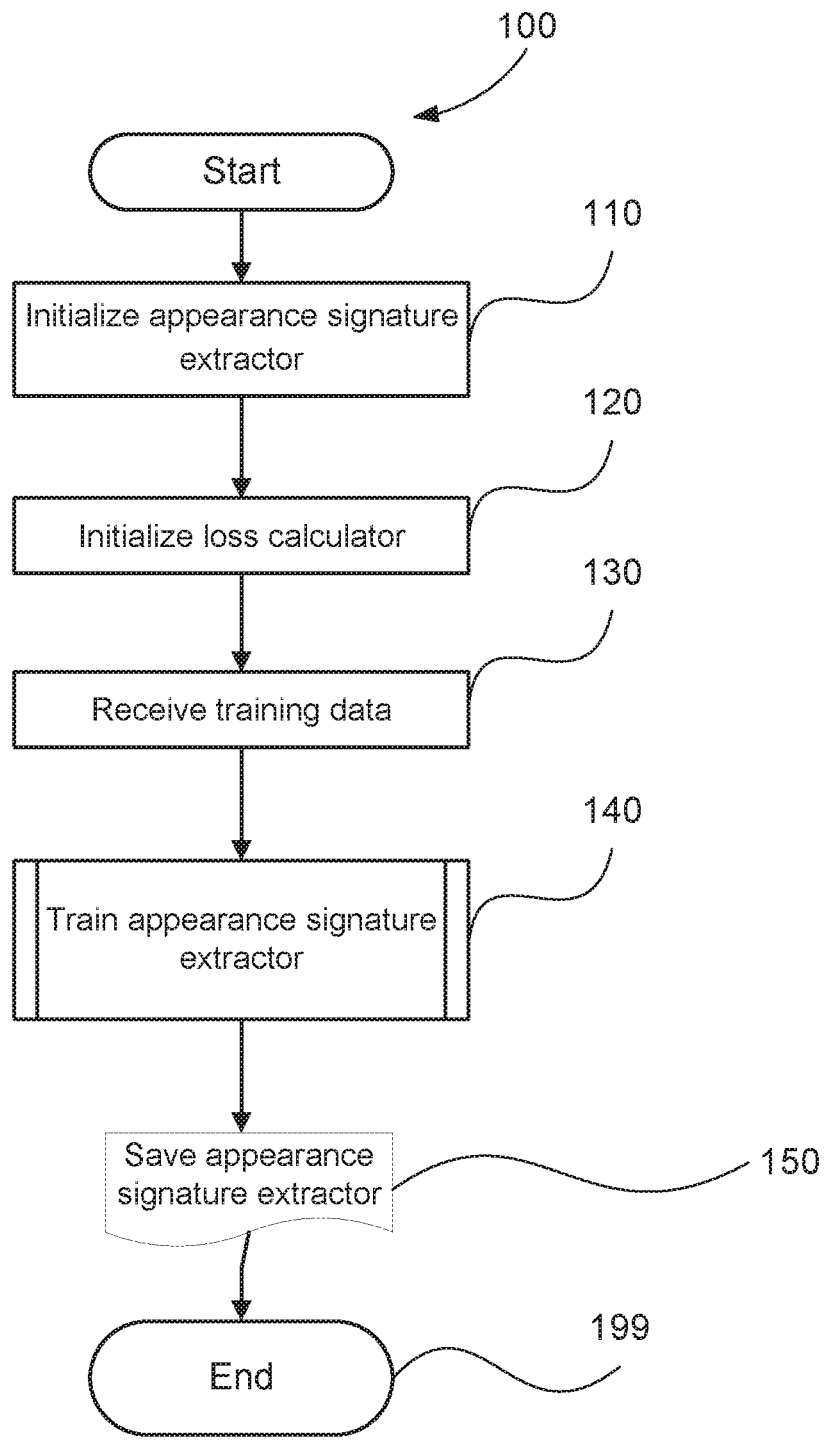
FIG. 1 shows a method of training an appearance signature extractor.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventors or the patent applicant that such documents or devices in any way form part of the common general knowledge in the art.

As discussed above, a training set can relate to multiple domains. It is known that scale of a dataset is an important factor in performance of re-identification. In the re-identification scenario, it would be advantageous to train an appearance signature extractor to maintain the appearance signature independent from the domains because the identity of the object does not relate to such domains.

Figure 4:
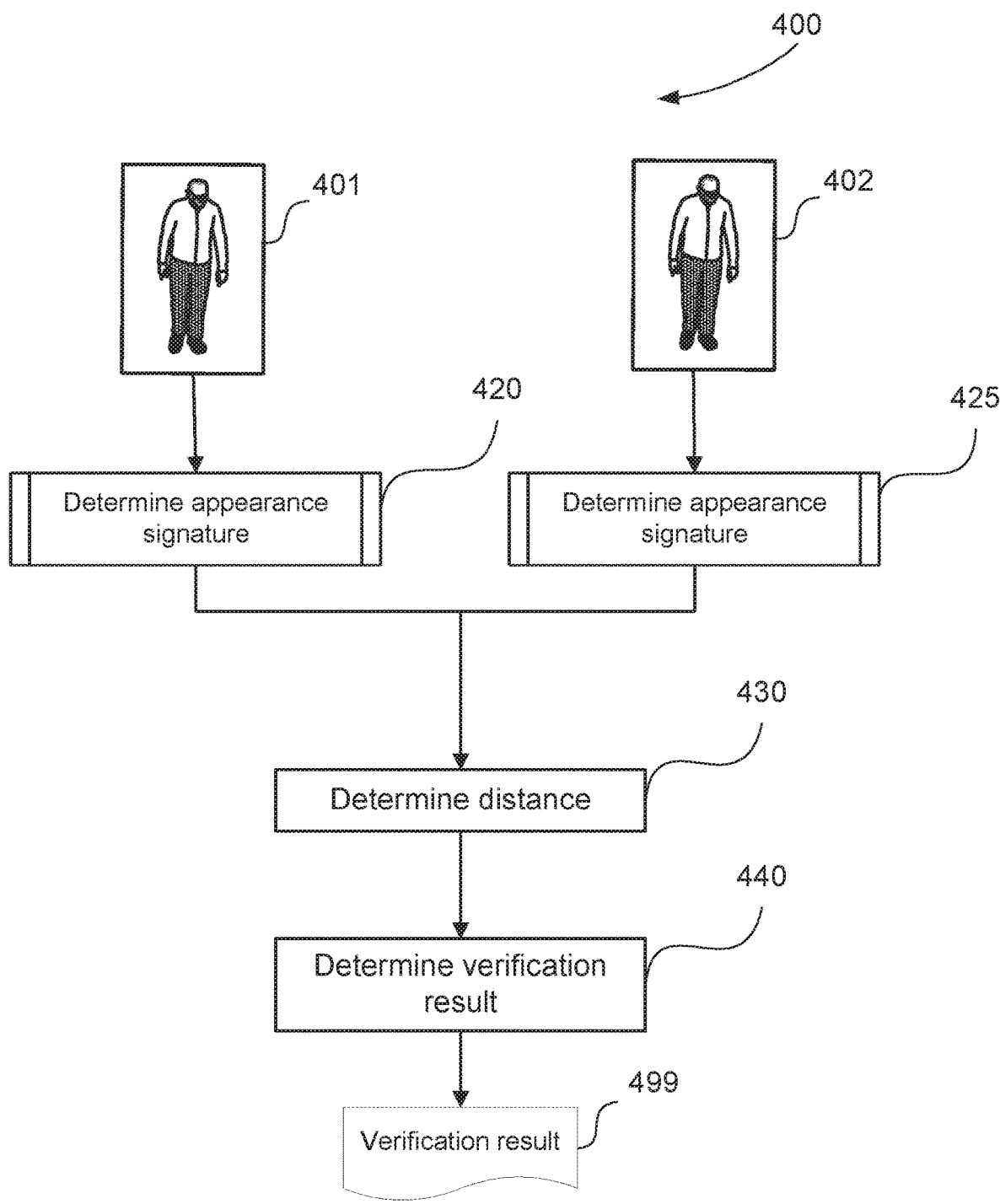
FIG. 4 shows a method of verifying objects using an appearance signature extractor.

FIGS. 1 and 4 illustrate an exemplary use case of training an appearance signature extractor and performing re-identification, respectively. The method of the training receives a training data and outputs an appearance signature extractor. The method of performing re-identification receives a pair of images and outputs a verification result. Such use case could be implemented by a general-purpose computer system depicted in FIG. 8A and FIG. 8B.

Figure 8A:
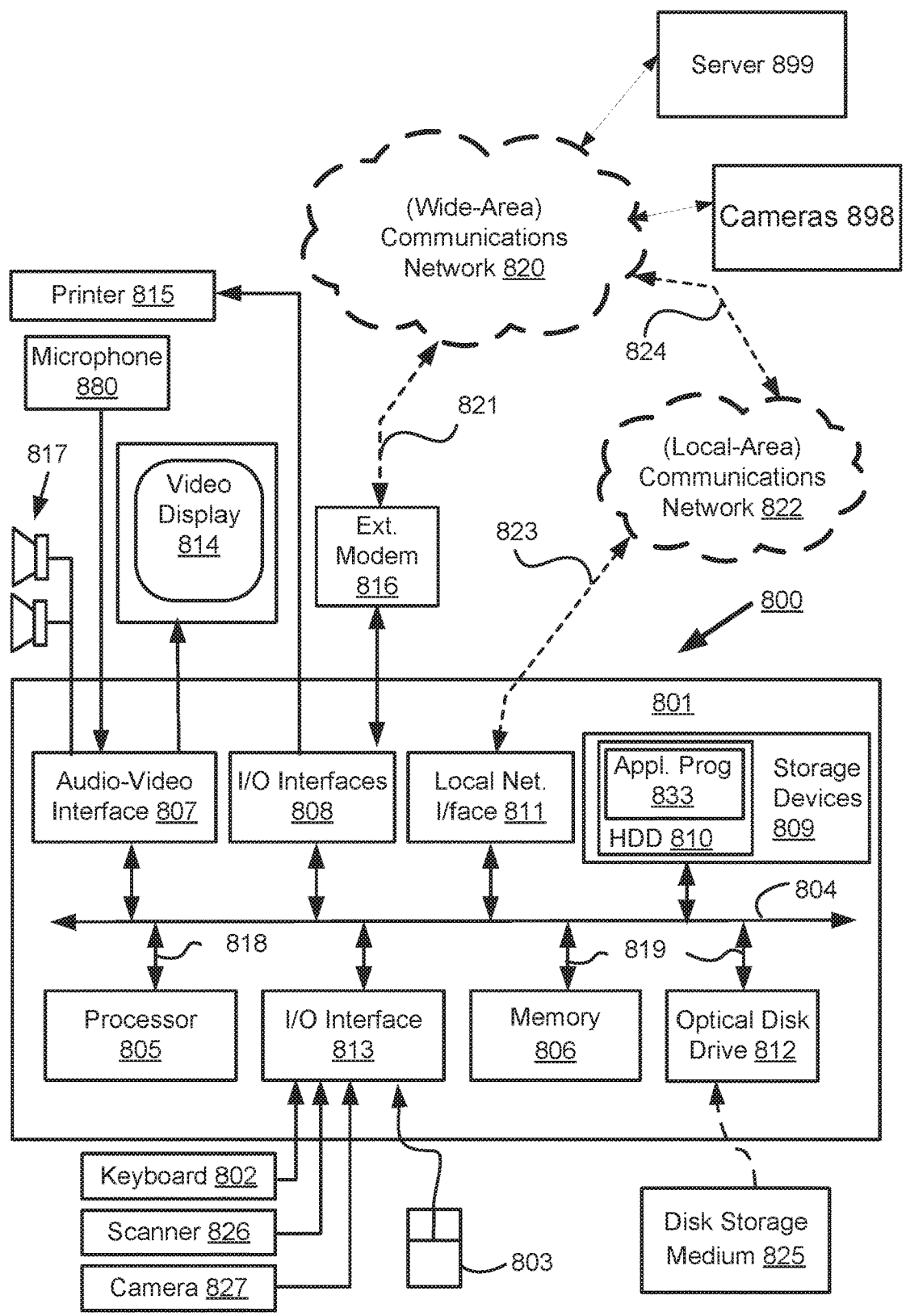
FIGS. 8A and 8B form a schematic block diagram of a general purpose computer system upon which the methods described can be practiced.
Figure 8B:
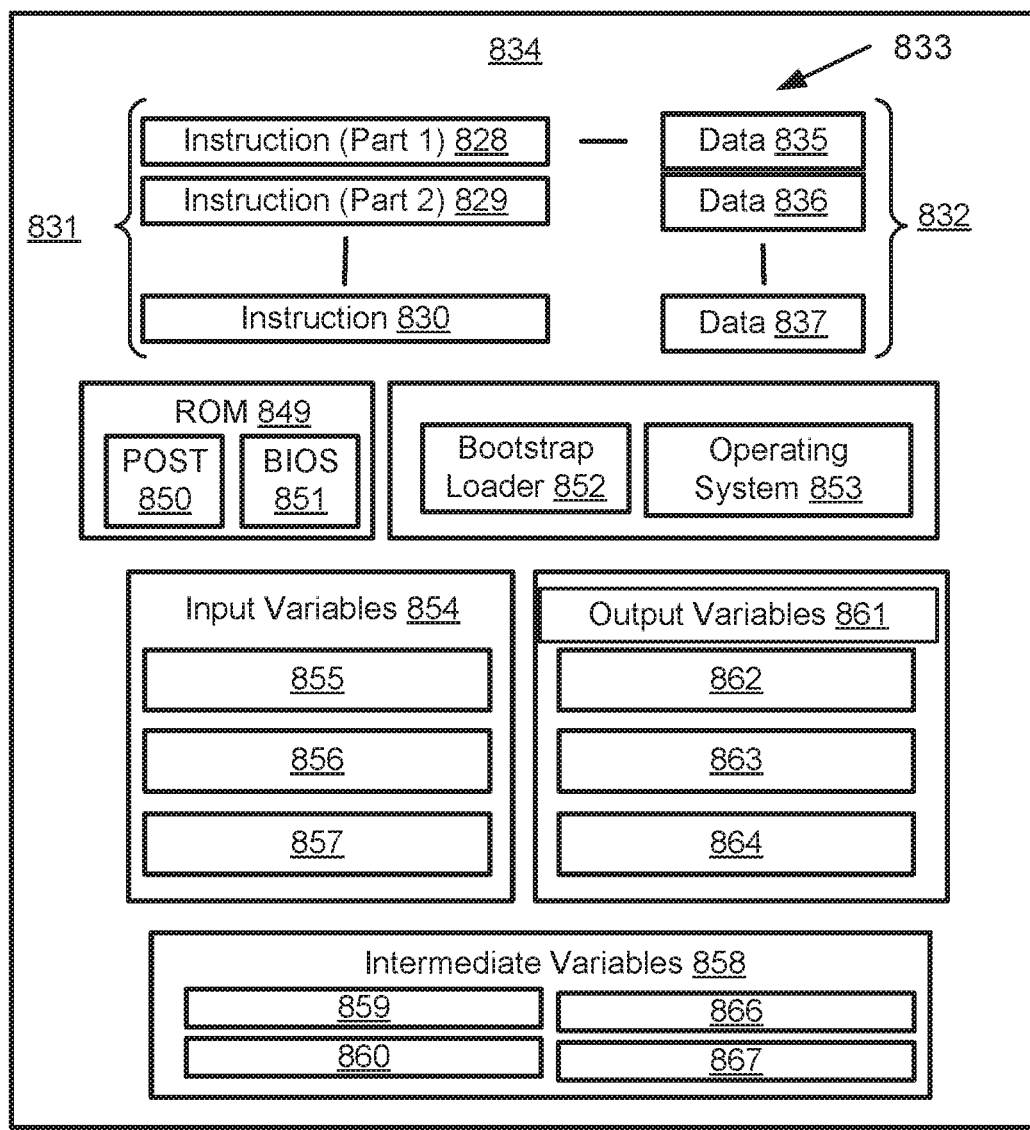
Figure 8B:
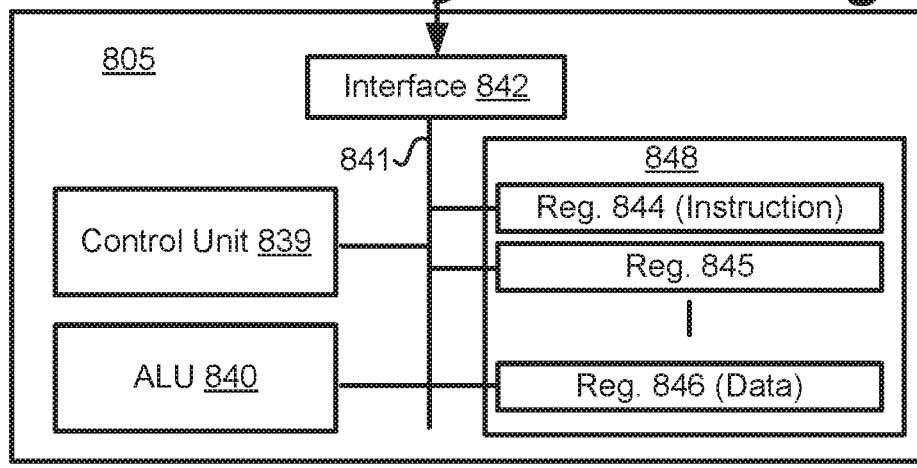

FIGS. 8A and 8B depict a general-purpose computer system 800, upon which the various arrangements described can be practiced.

As seen in FIG. 8A, the computer system 800 includes: a computer module 801; input devices such as a keyboard 802, a mouse pointer device 803, a scanner 826, a camera 827, and a microphone 880; and output devices including a printer 815, a display device 814 and loudspeakers 817. An external Modulator-Demodulator (Modem) transceiver device 816 may be used by the computer module 801 for communicating to and from a communications network 820 via a connection 821. The communications network 820 may be a wide-area network (WAN), such as the Internet, a cellular telecommunications network, or a private WAN. Where the connection 821 is a telephone line, the modem 816 may be a traditional "dial-up" modem. Alternatively, where the connection 821 is a high capacity (e.g., cable) connection, the modem 816 may be a broadband modem. A wireless modem may also be used for wireless connection to the communications network 820.

A training set in the context of the arrangements described comprises a set of input images. The input images are associated with a plurality of domains. Typically, each input image corresponds to one of the plurality of domains. The input images can be stored in the memory 806 or received via the network 820 from remote storage such as a server 899. Alternatively, the input images may be captured from image capture devices capable of transmitting images over the network 820, such as a set of digital cameras 898.

The computer module 801 typically includes at least one processor unit 805, and a memory unit 806. For example, the memory unit 806 may have semiconductor random access memory (RAM) and semiconductor read only memory (ROM). The computer module 801 also includes an number of input/output (I/O) interfaces including: an audio-video interface 807 that couples to the video display 814, loudspeakers 817 and microphone 880; an I/O interface 813 that couples to the keyboard 802, mouse 803, scanner 826, camera 827 and optionally a joystick or other human interface device (not illustrated); and an interface 808 for the external modem 816 and printer 815. In some implementations, the modem 816 may be incorporated within the computer module 801, for example within the interface 808. The computer module 801 also has a local network interface 811, which permits coupling of the computer system 800 via a connection 823 to a local-area communications network 822, known as a Local Area Network (LAN). As illustrated in FIG. 8A, the local communications network 822 may also couple to the wide network 820 via a connection 824, which would typically include a so-called "firewall" device or device of similar functionality. The local network interface 811 may comprise an Ethernet circuit card, a Bluetooth® wireless arrangement or an IEEE 802.11 wireless arrangement; however, numerous other types of interfaces may be practiced for the interface 811.

The I/O interfaces 808 and 813 may afford either or both of serial and parallel connectivity, the former typically being implemented according to the Universal Serial Bus (USB) standards and having corresponding USB connectors (not illustrated). Storage devices 809 are provided and typically include a hard disk drive (HDD) 810. Other storage devices such as a floppy disk drive and a magnetic tape drive (not illustrated) may also be used. An optical disk drive 812 is typically provided to act as a non-volatile source of data. Portable memory devices, such optical disks (e.g., CD-ROM, DVD, Blu-ray™), USB-RAM, portable, external hard drives, and floppy disks, for example, may be used as appropriate sources of data to the system 800.

The components 805 to 813 of the computer module 801 typically communicate via an interconnected bus 804 and in a manner that results in a conventional mode of operation of the computer system 800 known to those in the relevant art. For example, the processor 805 is coupled to the system bus 804 using a connection 818. Likewise, the memory 806 and optical disk drive 812 are coupled to the system bus 804 by connections 819. Examples of computers on which the described arrangements can be practiced include IBM-PC's and compatibles, Sun Sparcstations, Apple Mac™ or like computer systems.

The method 100 and other methods described below may be implemented using the computer system 800 wherein the processes of FIGS. 1 to 6, to be described, may be implemented as one or more software application programs 833 executable within the computer system 800. In particular, the steps of the method 200 are effected by instructions 831 (see FIG. 8B) in the software 833 that are carried out within the computer system 800. The software instructions 831 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 833 is typically stored in the HDD 810 or the memory 806. The software is loaded into the computer system 800 from the computer readable medium, and then executed by the computer system 800. Thus, for example, the software 833 may be stored on an optically readable disk storage medium (e.g., CD-ROM) 825 that is read by the optical disk drive 812. A computer readable medium having such software or computer program recorded on the computer readable medium is a computer program product. The use of the computer program product in the computer system 800 preferably effects an advantageous apparatus for implementing the described methods.

In some instances, the application programs 833 may be supplied to the user encoded on one or more CD-ROMs 825 and read via the corresponding drive 812, or alternatively may be read by the user from the networks 820 or 822. Still further, the software can also be loaded into the computer system 800 from other computer readable media. Computer readable storage media refers to any non-transitory tangible storage medium that provides recorded instructions and/or data to the computer system 800 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 801. Examples of transitory or non-tangible computer readable transmission media that may also participate in the provision of software, application programs, instructions and/or data to the computer module 801 include radio or infra-red transmission channels as well as a network connection to another computer or networked device, and the Internet or Intranets including e-mail transmissions and information recorded on Websites and the like.

The second part of the application programs 833 and the corresponding code modules mentioned above may be executed to implement one or more graphical user interfaces (GUIs) to be rendered or otherwise represented upon the display 814. Through manipulation of typically the keyboard 802 and the mouse 803, a user of the computer system 800 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 817 and user voice commands input via the microphone 880.

FIG. 8B is a detailed schematic block diagram of the processor 805 and a "memory" 834. The memory 834 represents a logical aggregation of all the memory modules (including the HDD 809 and semiconductor memory 806) that can be accessed by the computer module 801 in FIG. 8A.

When the computer module 801 is initially powered up, a power-on self-test (POST) program 850 executes. The POST program 850 is typically stored in a ROM 849 of the semiconductor memory 806 of FIG. 8A. A hardware device such as the ROM 849 storing software is sometimes referred to as firmware. The POST program 850 examines hardware within the computer module 801 to ensure proper functioning and typically checks the processor 805, the memory 834 (809, 806), and a basic input-output systems software (BIOS) module 851, also typically stored in the ROM 849, for correct operation. Once the POST program 850 has run successfully, the BIOS 851 activates the hard disk drive 810 of FIG. 8A. Activation of the hard disk drive 810 causes a bootstrap loader program 852 that is resident on the hard disk drive 810 to execute via the processor 805. This loads an operating system 853 into the RAM memory 806, upon which the operating system 853 commences operation. The operating system 853 is a system level application, executable by the processor 805, to fulfil various high level functions, including processor management, memory management, device management, storage management, software application interface, and generic user interface.

The operating system 853 manages the memory 834 (809, 806) to ensure that each process or application running on the computer module 801 has sufficient memory in which to execute without colliding with memory allocated to another process. Furthermore, the different types of memory available in the system 800 of FIG. 8A must be used properly so that each process can run effectively. Accordingly, the aggregated memory 834 is not intended to illustrate how particular segments of memory are allocated (unless otherwise stated), but rather to provide a general view of the memory accessible by the computer system 800 and how such is used.

As shown in FIG. 8B, the processor 805 includes a number of functional modules including a control unit 839, an arithmetic logic unit (ALU) 840, and a local or internal memory 848, sometimes called a cache memory. The cache memory 848 typically includes a number of storage registers 844-846 in a register section. One or more internal busses 841 functionally interconnect these functional modules. The processor 805 typically also has one or more interfaces 842 for communicating with external devices via the system bus 804, using a connection 818. The memory 834 is coupled to the bus 804 using a connection 819.

The application program 833 includes a sequence of instructions 831 that may include conditional branch and loop instructions. The program 833 may also include data 832 which is used in execution of the program 833. The instructions 831 and the data 832 are stored in memory locations 828, 829, 830 and 835, 836, 837, respectively. Depending upon the relative size of the instructions 831 and the memory locations 828-830, a particular instruction may be stored in a single memory location as depicted by the instruction shown in the memory location 830. Alternately, an instruction may be segmented into a number of parts each of which is stored in a separate memory location, as depicted by the instruction segments shown in the memory locations 828 and 829.

In general, the processor 805 is given a set of instructions which are executed therein. The processor 805 waits for a subsequent input, to which the processor 805 reacts to by executing another set of instructions. Each input may be provided from one or more of a number of sources, including data generated by one or more of the input devices 802, 803, data received from an external source across one of the networks 820, 802, data retrieved from one of the storage devices 806, 809 or data retrieved from a storage medium 825 inserted into the corresponding reader 812, all depicted in FIG. 8A. The execution of a set of the instructions may in some cases result in output of data. Execution may also involve storing data or variables to the memory 834.

The disclosed arrangements use input variables 854, which are stored in the memory 834 in corresponding memory locations 855, 856, 857. The disclosed arrangements produce output variables 861, which are stored in the memory 834 in corresponding memory locations 862, 863, 864. Intermediate variables 858 may be stored in memory locations 859, 860, 866 and 867.

Referring to the processor 805 of FIG. 8B, the registers 844, 845, 846, the arithmetic logic unit (ALU) 840, and the control unit 839 work together to perform sequences of micro-operations needed to perform "fetch, decode, and execute" cycles for every instruction in the instruction set making up the program 833. Each fetch, decode, and execute cycle comprises:

a fetch operation, which fetches or reads an instruction 831 from a memory location 828, 829, 830;

a decode operation in which the control unit 839 determines which instruction has been fetched; and an execute operation in which the control unit 839 and/or the ALU 840 execute the instruction.

Thereafter, a further fetch, decode, and execute cycle for the next instruction may be executed. Similarly, a store cycle may be performed by which the control unit 839 stores or writes a value to a memory location 832.

Each step or sub-process in the methods of FIGS. 1 to 6 is associated with one or more segments of the program 833 and is performed by the register section 844, 845, 847, the ALU 840, and the control unit 839 in the processor 805 working together to perform the fetch, decode, and execute cycles for every instruction in the instruction set for the noted segments of the program 833.

The following describes an example use case in which the object for the object matching is a person. Another example could use other objects such as a human face, vehicle and animal for the object matching.

FIG. 1 shows a method 100 of training an appearance signature extractor. The method 100 receives training data from a training data set as input and saves the appearance signature extractor as output. The method 100 is implemented as one or more modules of the software application programs 833 that are executable on the processor 805 and stored in the memory 806.

The method 100 starts at an initializing step 110. In step 110, the method 100 initializes the appearance signature extractor. As described below, the appearance signature extractor could include ANN (Artificial Neural Network). The method 100 sets initial values to weights of layers in the appearance signature extractor. The initial values can be random numbers. Another example of initial values is to use pre-trained weights, where weights in another ANN (Artificial Neural Network) are trained using another dataset prior to step 110 and the trained weights are transferred to the appearance signature extractor. In an alternative implementation, the appearance signature extractor could be combination of an image feature extractor (for example, Histogram of Oriented Gradients) and a projection method (for example, projection to sub space).

The method 100 continues from step 110 to an initializing step 120. In step 120, the method 100 initializes a loss calculator. As described below, the loss calculator could include an ANN (Artificial Neural Network). Step 120 executes to set initial values to weights in the ANN (Artificial Neural Network). The initial values could be random numbers.

The method 100 continues from step 120 to a receiving step 130. Step 130 receives training data. The training data set is a set of training samples associated with a number of domains. Each training sample includes an input image, a corresponding identity label and a corresponding domain label. The input image is an RGB image of an object with fixed width and height. The domain label provides information about a domain where the corresponding input image is captured. The domain information of the input image can for example relate to a particular location where the image was captured or a particular device or setting used to capture the image. The example use case described herein assumes that the training data includes D domains. The domain label could provide an index number that takes values from 0 to D−1. In some arrangements the domain label provides information regarding at least one of place, time, weather, environment, event, and acquisition equipment. Weather and environment domains can relate to visibility, atmospheric conditions, background landscape and the like. Event domains can relate to an overall event for example, a stadium when empty compared to a stadium when an audience attended game is in progress or occurrence of a localized event. Acquisition equipment can relate to a particular image capture device, a setting of an image capture device, or a viewpoint or direction of viewpoint of an image capture device. For example, each index having a value between 0 and D-1 can have associated domain information. The domain label can include domain information or an index or pointer to for a database of domain information. The domain information can be generated in a number of ways, for example generated by an image capture device that captures the input image, entered manually by a person creating the training set, or based on known parameters of an image capture device and the like.

The identity label provides information about an identity of an object of interest captured in the corresponding input image. The identity information of the identity label can distinguish instances or categories of the object. For example, if the object is a person, the identity label distinguishes individuals. The identity label could be an index number within a set. Assuming $d^{th}$ domain includes $I_d$ identities in the training data, the identity label could take from 0 to $I_d$−1.

Figure 2:
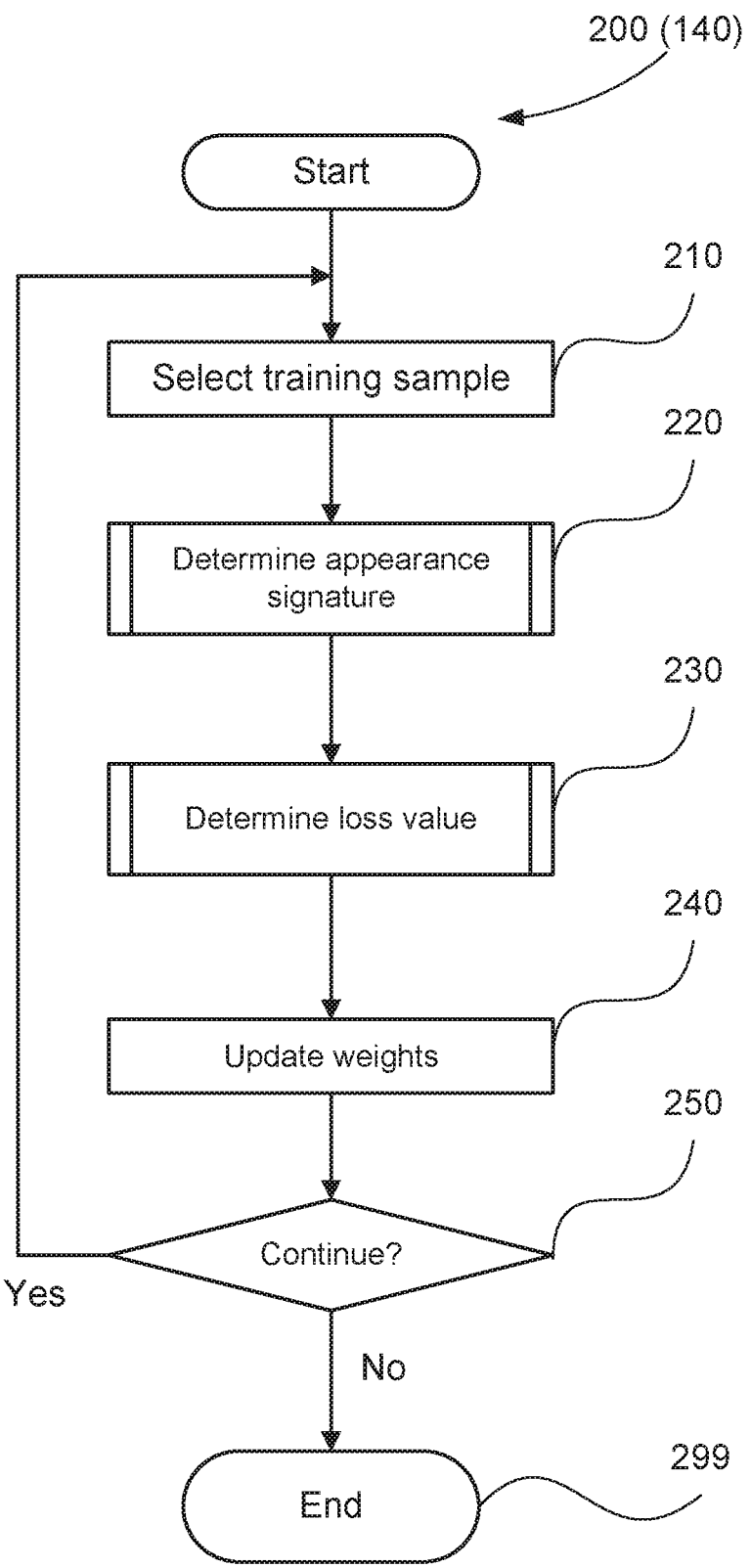
FIG. 2 shows a method of training an appearance signature extractor used in the method shown in FIG. 1.

The method 100 continues from step 130 to a training step 140. Step 140 trains the appearance signature extractor using the training data. FIG. 2 shows a method 200 as implemented at step 140. The method 200 receives the training data and outputs the trained appearance signature extractor.

The method 200 is typically implemented as one or more modules of the application 833, stored in the memory 806 and controlled under execution of the processor 805. As shown in FIG. 2, the method 200 starts at a selecting step 210. Step 210 executes to select a training sample from the training data. The selecting could be done randomly, based on a numeric or temporal order of the training set, or the like.

Figure 3:
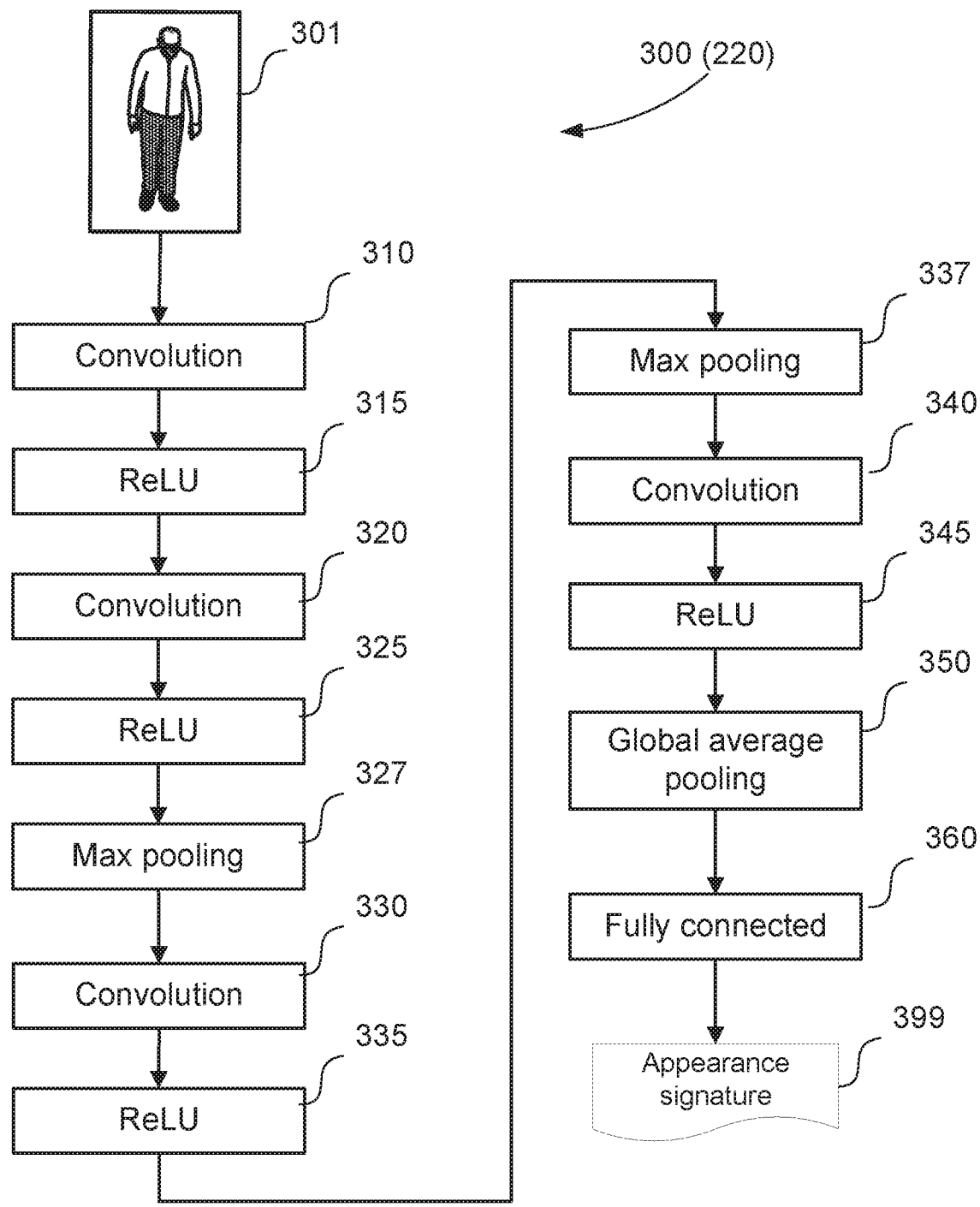
FIG. 3 shows an architecture determining appearance signature of the method shown in FIGS. 2 and 4.

The method 200 continues from step 210 to a determining step 220. Step 220 determines an appearance signature from the input image using the appearance signature extractor. FIG. 3 shows an example architecture 300 used to extract an appearance signature 399 from the input image 301.

In the example described, the appearance signature extractor includes a CNN (Convolutional Neural Network) with multiple layers as illustrated by the architecture 300 in FIG. 3. Input of a training sample 301 to the appearance signature extractor is propagated along a sequence of layers of convolution 310, rectifier linear units (ReLU) 315, convolution layer 320, ReLU 325, max pooling 327, convolution 330, ReLU 335, max pooling 337, convolution 340, ReLU 345, global average pooling 350 and fully connected 360, resulting in the output 399. The input 301 to the appearance signature extractor is an image and the output 399 is a vector of the appearance signature. An intermediate output of each layer is saved to the memory 806 for performing back propagation algorithm at later step. The input 301 is a tensor of W×H×3 (width×height×3). The convolution layer 310 outputs a tensor of W×H×C1. The convolution layer 320 outputs a tensor of W×H×C2. The max pooling layer 327 outputs a tensor of W/2×H/2×C2. The convolution 330 layer outputs a tensor of W/2×H/2×C3. The max pooling layer 337 outputs a tensor of W/4×H/4×C3. The convolution layer 340 outputs a tensor of W/4×H/4×C4. The global average pooling 350 outputs a vector of C4. The fully connected layer 360 outputs a vector of C5 being an appearance signature 399. Each of the ReLU layers 315, 325, 335, 345 does not change the tensor size.

Returning to FIG. 2, the method 200 continues from step 220 to a determining step 230. Step 230 determines a loss value from the appearance signature 399, the identity label and the domain label by using a loss calculator.

Figure 5:
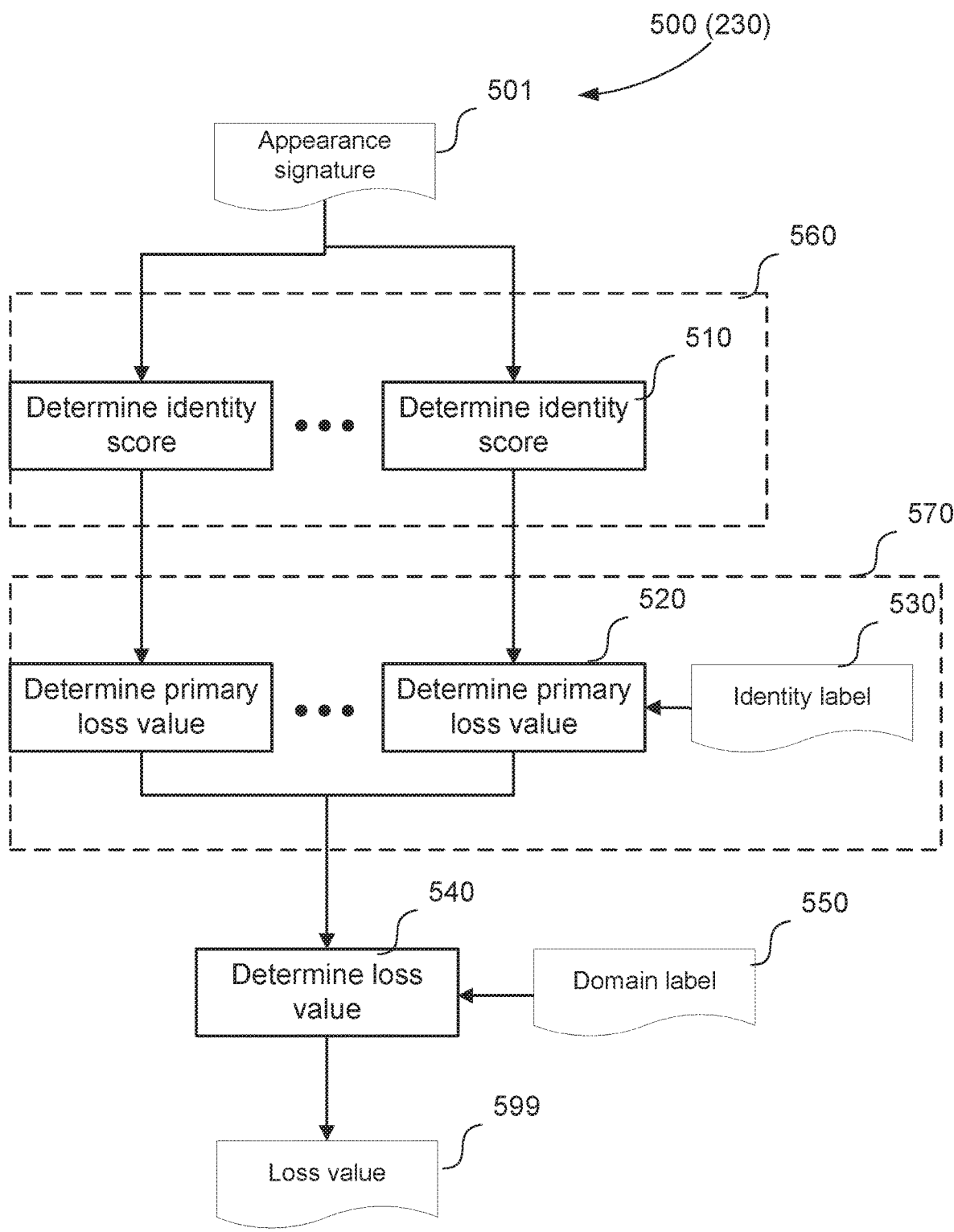
FIG. 5 shows a method of determining a loss value used in the method shown in FIG. 2.

FIG. 5 shows a method 500 implemented at Step 230 to determine the loss value. The loss calculator method 500 has inputs of an appearance signature 501, an in identity label 530 and a domain label 550. The method 500 outputs a loss value 599.

The method 500 starts at a determining step 560. Step 560 determines an identity score, also referred to as an identity probability, from the appearance signature 501. in particular, step 560 determines the identity score or identity probabilities for each domain (for each input) separately. The identity probability represents which identities the appearance signature belongs to. The identity probability is a vector, where more probable elements have a larger value. The length of the vector is determined by number of identities included in the domain. Assuming dth domain includes $I_d$ identities in the training data, the length of the vector at the domain is $I_d$. As the result of execution of step 560, the D vectors are obtained, where D is number of domains contained in the training data.

Assuming the training data includes D domains, step 560 can include D independent steps corresponding to each domain, effectively determining an identity score for each of the plurality of domains. Each step corresponding to each domain (step 510) includes an identity classifier which is independent of the other domains. Each identity classifier determines the identity probability from the appearance signature 501. Each identity classifier is preferably a sequence of one or more fully connected layers followed by a softmax layer. By applying the softmax layer, the summation of the elements in the output is normalized to one, and thus the vector can be treated as probability distribution. Other implementations could use another normalization method and distance measurement (such as L2 normalization and L2 distance).

The method 500 continues from step 560 to a determining step 570. Step 570 determines primary loss values between the identity probabilities and identity label. The primary loss value relates to an error between the identity score and the identity label. In more detail, step 570 operates to determine the primary loss value for each domain separately. Step 570 can therefore operate to determine a loss value for each domain of the plurality of domains of the training data set. The primary loss value represents a degree of error between the identity probability and identity label evaluated on the domain. As the result of Step 570, D primary loss values are obtained.

Assuming the training data includes D domains, step 570 includes D independent steps corresponding to each domain. Each step corresponding to each domain (such as step 520) determines the primary loss value for each domain. The identity label is converted into a one-hot vector, where a vector element that corresponds to the correct identity is one and other vector elements are zero. If a particular identity is not included in the domain, the vector elements are filled with uniform value $1/I_d$, where $I_d$ is number of identities in the $d^{th}$ domain. Step 520 determines the dissimilarity between the identity probability and the identity label. The dissimilarity of the probability distribution is typically determined using cross entropy, as shown in Equation 4.

$$H(p, q) = -\Sigma_x p(x) \log q(x) \qquad (4)$$

In Equation 4, p is the identity label, and q is the probability of identity.

The method 500 continues from step 570 to a determining step 540. Step 540 determines the loss value 599 from the primary loss values of Step 570 and the domain label 550. The domain label is converted into a one-hot vector, where a vector element that corresponds to the correct domain is one and other remaining vector elements are zero. Step 540 determines an inner product of the vector of the domain label 550 and a vector generated by concatenating the primary loss values determined at step 570. The inner product of vectors a and b are determined according to Equation (5).

$$a \cdot b = \Sigma_i a_i b_i \qquad (5)$$

Execution of step 540 is equivalent to selecting one from the primary loss values according to the domain label 550. The equivalence is because the domain label is a one-hot vector which the elements are zero except the corresponding domain, and terms which the elements are zero are ignored in Equation (5).

In FIG. 5, step 560 (containing steps 510), step 570 (containing steps 520) and Step 540 are implemented as ANN (Artificial Neural Network) layers. Therefore, the loss calculator includes an ANN (Artificial Neural Network).

Returning to FIG. 2, the method 200 continues from step 230 to an updating step 240. Step 240 executes to update the appearance extractor by updating weights in the appearance signature extractor and the loss calculator using the loss value determined at step 230. The weights are updated using a back propagation algorithm. The back propagation algorithm updates the weights of the layers successively from end to start of the node chain. At a node, an error signal and updated weights are determined using an error signal from the previous node and weights and output value of the current node. The error signal propagates to the next node.

The method 200 continues from step 240 to a check step 250. Step 250 determines whether the iteration of the method from step 210 to 240 should continue or not. If a stop criteria is satisfied ("No" at step 250), the method 200 goes to step 299 and ends. If the stop criteria is not satisfied ("Yes" at step 250), the method 200 returns to step 210. The stop criteria can be that a number of the iteration is more than a pre-determined number. Another example of the stop criteria could be the loss value determined in step 230 is less than a pre-determined value.

Execution of step 299 terminates the method 200.

Referring back to FIG. 1, step 150 saves the appearance signature extractor to the storage devices 809. The steps 140 and 150 are implemented for each instance of training data to generate the appearance signature extractor. Step 140 trains the appearance signature extractor and step 150 saves the appearance signature extractor.

Upon completion of step 150 the method 100 terminates.

FIG. 4 shows a method 400 of verifying whether two input images have the same identity using the appearance signature extractor trained using the method 100. The method 400 is typically implemented as one or more modules of the application 833, stored in the memory 806 and controlled under execution of the processor 805.

The appearance signature extractor used in the method 400 is trained using the method 100 of FIG. 1. In FIG. 4, the method 400 receives a first input image 401 and a second input image 402, and outputs a verification result 499. The first input image and the second input image may be received from different cameras of the set 898 for example.

The method 400 begins at a determining step 420. Execution of step 420 determines a first appearance signature from the first input image 401. Step 420 operates in a similar manner to step 220 of FIG. 2.

The method 400 also includes another determining step 425. Step 425 determines a second appearance signature from the second input image 402. Step 425 operates in a similar manner to step 220 of FIG. 2.

The steps 420 and 425 may be executed concurrently, or in a particular order. In the example above, the method 400 starts at step 420. However, the order may be changed.

The method 400 continues to a determining step 430 upon completion of steps 420 and 425. Step 430 determines a distance between the first and second appearance signatures determined at steps 420 and 425. The distance can be determined using Euclidian distance between vectors of the first and second appearance signatures or other known techniques such as cosine distance and L1 distance.

The method 400 continues from step 430 to a determining step 440. Step 440 determines the verification result 499 from the distance. The verification result is a binary flag. If the distance is lower than a pre-determined threshold value, the objects of two input images are the same identity. Otherwise, the objects of two input images are the different identities.

In FIG. 5, the training method 500 determines the primary loss values for each domain separately (Step 570), and selects one of the primary loss values according to the domain label to determines the loss value (Step 540). ANN (Artificial Neural Network) layers related to unselected domains do not affect the loss value. Similarly, in updating the weights in step 240 (FIG. 2), the ANN (Artificial Neural Network) layers related to unselected domain are not updated by the back propagation algorithm. Therefore, the training sample of a specific domain updates the ANN (Artificial Neural Network) layers related to the corresponding domain. As the result, the training method 500 reduces the effect that the ANN (Artificial Neural Network) in the appearance signature extractor learns the representation to distinguish domain.

Previously known training methods using classification loss do not determine a loss value according to a particular domain of the input image. Because the classification of identity is performed without separating domains, domain information can be used to distinguish the identity. Accordingly, the appearance signature extractor typically generates a representation on a basis that the domain is easily distinguished. Picking up domain information by ANN (Artificial Neural Network) degrades re-identification performance. In contrast, the methods described can operate to reduce an effect of distinguishing the identity using the domain information, because the domain is already separated in the training process. Accordingly, the training method 100 provides an improvement in that the appearance signature extractor learns the representation independently of the domain. Therefore, the training method of FIG. 1 improves re-identification performance.

Figure 9:
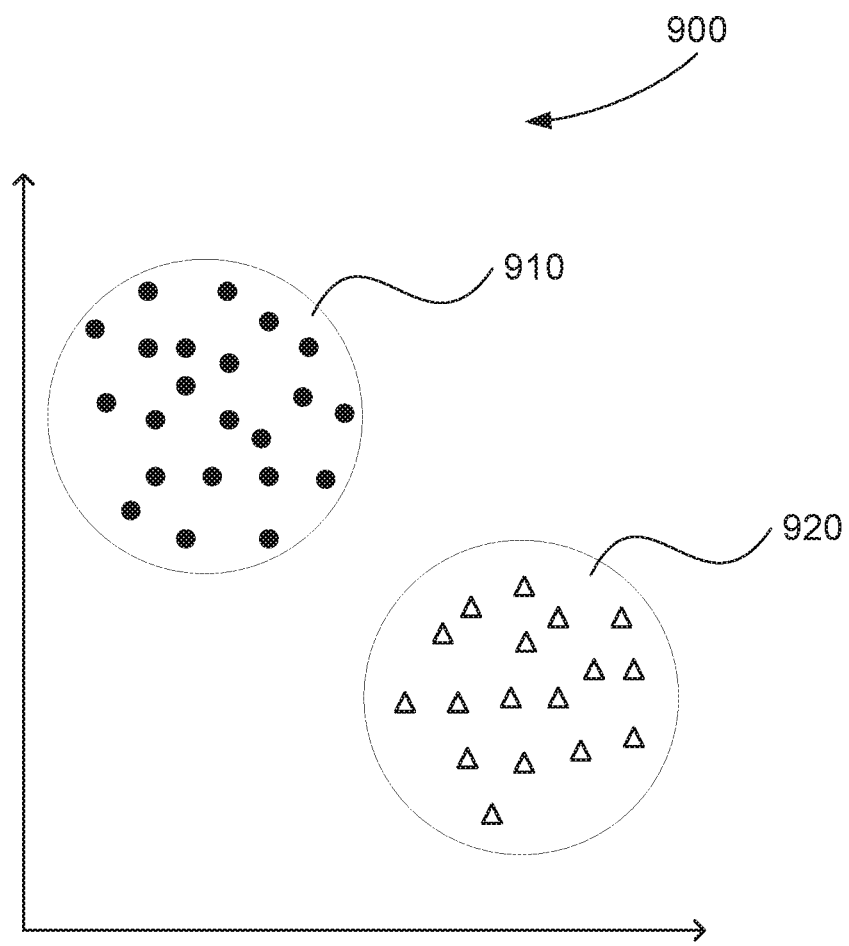
FIG. 9 illustrates distributions of appearance signatures by a conventional training method using classification loss.

In particular, different domains may share a number of matching identities (for example the same person being captured at different remote places). In conventional training methods with a classification loss, there is typically a bias during training to "push domains apart" by using domain-specific information to train the classifier to classify non-matching identities (i.e. different individuals) across different domains. In other words, the classifier (appearance signature extractor) learns that the given identities from different domains do not match because the domains are different. Classification based on different domains is generally undesirable as the classification leads to inability of the classifier to correctly classify matching identities (the same person appearing in different places) across different domains. The undesired training behavior happens as typically the amount of non-matching identities across different domains is significantly larger than the amount of matching identities across different domains. FIG. 9 shows a graph 900 with two distributions of appearance signatures from different domains, as trained using a conventional training method. Though the feature space is typically multi-dimensional, FIG. 9 shows two-dimensional space for ease of reference. Distributions 910 and 920 arise from different domains, and are accordingly pushed apart. The method 100 described above reduces the effect of being pushed apart, because the method 100 reduces the effect of distinguishing the domains at step 540.

Figure 10:
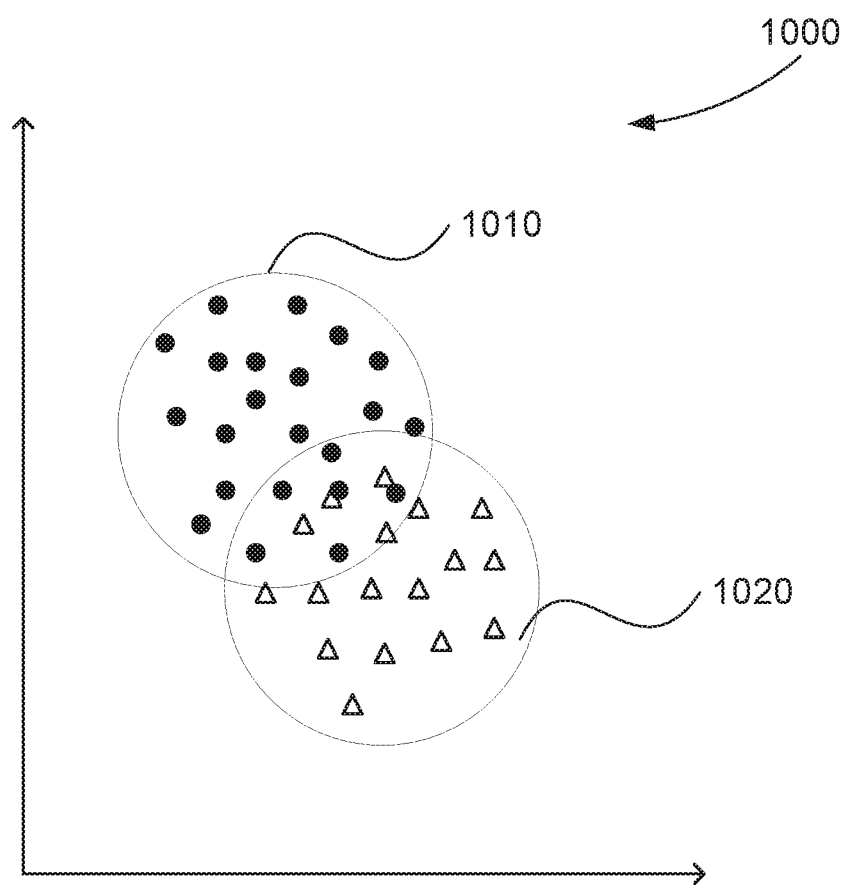
FIG. 10 illustrates distributions of appearance signatures by the training method of FIG. 1.

FIG. 10 shows a graph 1000 with two distributions of appearance signatures from different domains by the training method 100. Distributions 1010 and 1020 arise from different domains, but are closer to each other than the distributions 910 and 920 of FIG. 9.

In FIG. 5, the identity probability of step 510 is provided to step 520 for each domain, and step 540 is selected as one of the primary loss values according to the domain label. Accordingly, the appearance signature extractor is updated for each domain separately. Updating the appearance extractor for each domain operates to reduce the effect of the appearance signature extractor using domain information for re-identification.

By implementing the loss calculator as an ANN (Artificial Neural Network), a back propagation algorithm can be applied for training. Training using back propagation enables deep learning frameworks such as Tensorflow to be used.

Figure 6:
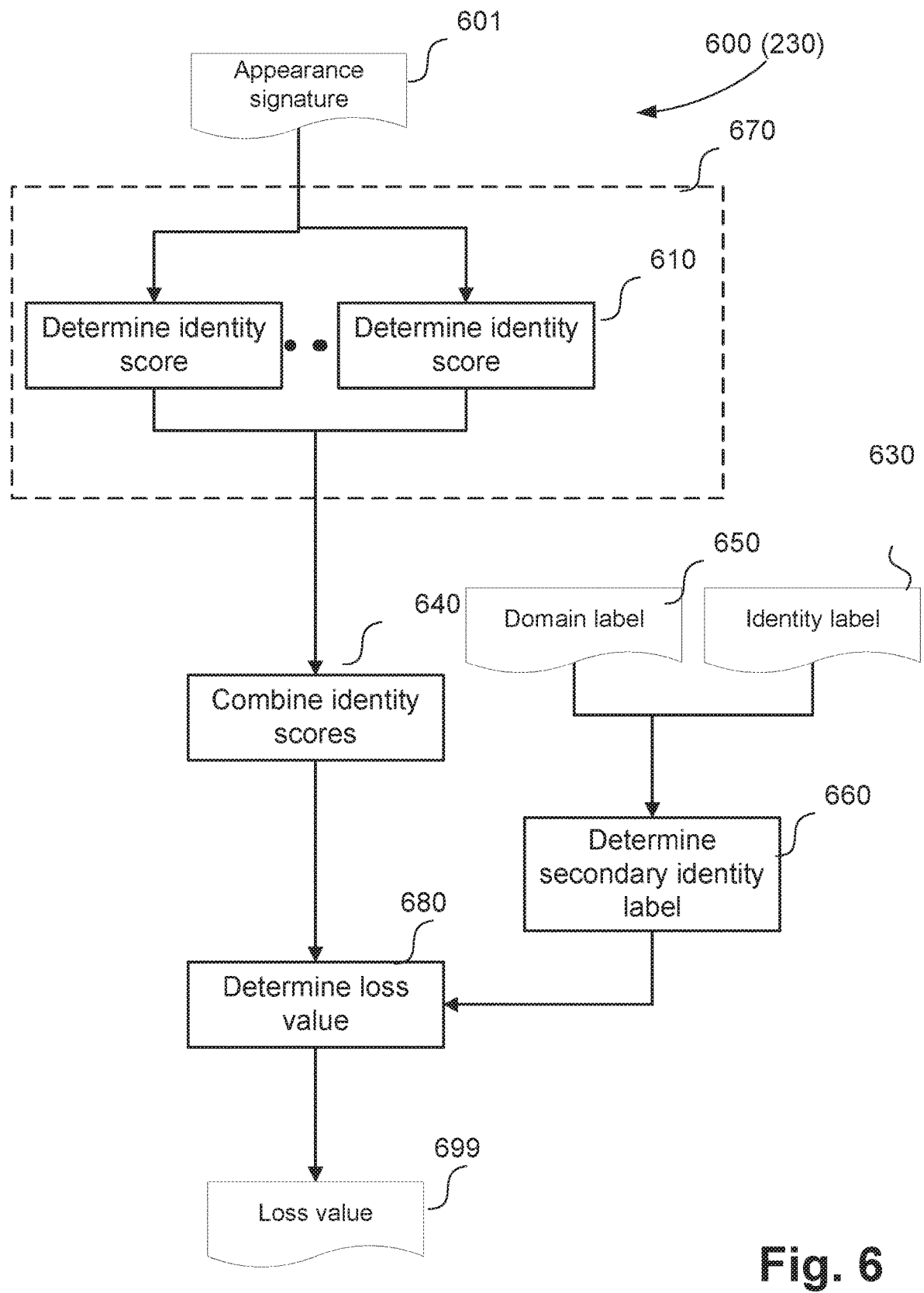
FIG. 6 shows an alternative method of determining a loss value used in the method shown in FIG. 2.
Figure 7:
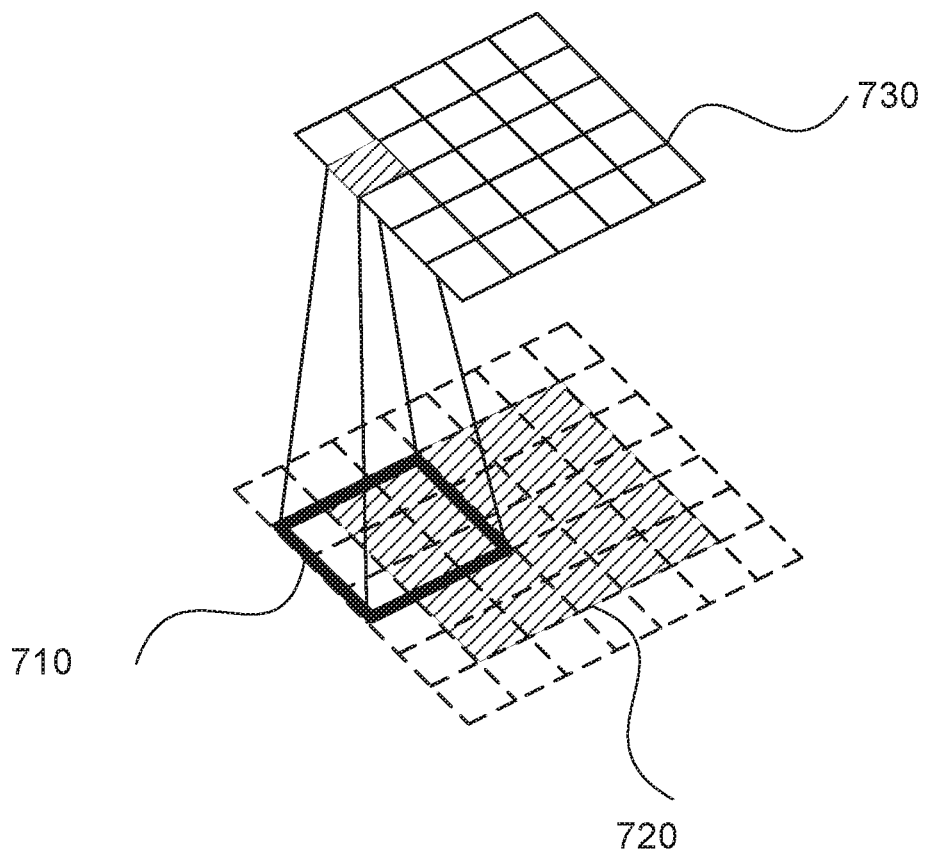
FIG. 7 illustrates a convolution operation in a CNN (Convolutional Neural Network)

FIG. 6 shows a method 600. The method 600 provides another example of implementing the step 230 of FIG. 2. The method 600 is typically implemented as one or more modules of the application 833 stored in the memory 806 and controlled under execution of the processor 805. The method 600 determines a loss value from the appearance signature, the identity label and the domain label using a loss calculator. The method 600 has inputs of the appearance signature 601, identity label 630, domain label 650, and an output of loss value 699.

The method 600 starts at a determining step 670. Step 670 operates to determine an identity score, also referred to as an identity probability, of the appearance signature 601. Step 670 operates determines the identity score or identity probabilities for each domain separately, as indicated by a sub-step 610. Step 670 operates in a similar manner to Step 560. As a result of executing Step 670, D vectors are obtained, where D is number of domains contained in the training data. Each of the D vectors describes an identity probability of the input.

Assuming the training data includes D domains, step 670 typically includes D parallel steps corresponding to each domain. Alternatively, the D steps can be implemented sequentially or discretely in batches. Each parallel step (step 610) is implemented similarly to Step 510. Each identity classifier used in Step 610 determines the identity probability from the appearance signature 601.

The method 600 continues from step 670 to a combining step 640. Step 640 combines the identity probabilities of all domains to determine a combined identity probability. Execution of step 640 concatenates vector elements of the identity probabilities. Equation (6) indicates the concatenation of vectors $v_0, v_1, \ldots, V_{D-1}$.

$$V = (v_0 \, v_1 \ldots v_{D-1}) \qquad (6)$$

The method 600 executes a determining step 660. The step 660 can be executed in parallel with either of steps 670 or 640, or before or after steps 670 and 640. Step 660 executes to determine a secondary identity label from the domain label 650 and the identity label 630. The secondary identity label is a vector having a length the same as the length of the combined identity probability. The secondary identity label is represented as the concatenation of vectors $u_0, u_1, \ldots, u_{D-1}$ as in Equation (7), where each vector has the same size as identity probability.

$$U = (u_0 \, u_1 \ldots u_{D-1}) \qquad (7)$$

The identity label 630 is converted into a one-hot vector at step 660, where a vector element that corresponds to the correct identity is one and other vector elements are zero. If the domain label is d, the $d^{th}$ vector of Equation (6) is replaced by the identity label of the one-hot representation, and the other vectors of Equation (7) are replaced with a zero vector. A zero vector refers to a vector which all elements are zero.

Once steps 640 and 660 are completed, the method 600 continues to a determining step 680. Step 680 determines a loss value 699 between the combined identity probability and the secondary identity label. The loss value 699 relates to an error between the identity score and the identity label. Step 680 determines the dissimilarity between the combined identity probability and the secondary identity label. The dissimilarity is determined using the same equation as cross entropy as in Equation (4). Accordingly, the method 600 operates to determine a loss value at step 680 according to the secondary label, which includes the domain label.

In FIG. 6, Step 670 (containing Step 610), Step 640 and Step 680 are implemented as ANN (Artificial Neural Network) layers. Therefore, the loss calculator includes an ANN (Artificial Neural Network). Accordingly, a back propagation algorithm can be applied for training. This enables to utilize popular Deep Learning framework such as Tensorflow The method 500 and 600 provide alternate implementations of the step 230. However, each of steps 540 and 680 operate to determine a loss value between an identity score and an identity label according to the domain label.

Though different configurations are provided by the methods 500 and 600, Step 230 (FIG. 2) of both implementations output the same loss value in theory. In the method 500, Step 540 (FIG. 5) selects one of the primary loss values according to the domain label. In the method 600, elements in the secondary identity label are filled with zero except for the elements related to the domain label. In Equation (4) of Step 680 (FIG. 6), vectors where the element of the secondary identity label is zero are ignored. Therefore, only the identity probability related to the domain label has an effect on determination of the loss value. Using only the identity probability related to the domain has the same effect of selecting one of primary loss values determined using the method 500.

Accordingly, operation of the method 600 has a similar effect operation of the method 500.

Benefits of operation of the method 600 include that the determination can be performed using computationally simpler operation to the method 500 such as concatenation. The number of cross entropy determinations can accordingly be reduced without degradation to performance. As a result, implementation of the ANN (Artificial Neural Network) in the loss calculator can be reduced.

The arrangements described are applicable to the computer and data processing industries and particularly for the image processing and re-identification industries.

The foregoing describes only some embodiments of the present invention, and modifications and/or changes can be made thereto without departing from the scope and spirit of the invention, the embodiments being illustrative and not restrictive.

Each of the methods 500 and 600 (at steps 540 and 680 respectively) determine a loss value between an appearance signature (determined at step 560 or 670) and an identity score (from step 570 or step 660) according to the domain label associated with the input image. In accounting for the domain label is training, the appearance signature extractor is less prone generating an appearance signature based upon variations in domain appearance rather than object appearance. The domain label including information regarding the domain and determining the loss according to the domain label in the manner of FIGS. 5 and 6 provides improved manner compared to distinguishing domains as being wither the same or different. Accordingly, the methods described can be applied for more than two domains.

In an example implementation, the training method 100 can be used to train an appearance signature extractor for use in security implementations, such as tracking a person of interest in an airport. Different domains in the airport could include an entrance, a check-in area, a security area and a departure lounge for example. An appearance signature extractor is trained using the method 100 using a training data set including images from each of the domains and one of the implementations of the step 230 described herein. After training, images of a person of interest in the check-in area and the departure lounge are input to the appearance signature extractor and re-identification performed according to the method 400. Due to training based upon the domain label in the method 100, the method 400 is less likely to determine that the images of the person of interest in the check-in area and the departure lounge relate to different people due to the differences in domain.

The claim(s) defining the invention are as follows:

1. A method of training an appearance signature extractor using a training data set, the training data set including input images associated with a plurality of domains, the method comprising:
    inputting an input image of the training data set, an identity label, and a domain label to the appearance signature extractor, wherein the identity label provides identity information of the input image, and the domain label provides domain information of the input image, the domain information corresponding to one of the plurality of domains;
    determining an appearance signature from the input image using the appearance signature extractor;
    determining identity scores for the plurality of domains respectively, based on the appearance signature;
    determining a loss value from among loss values respectively calculated for the plurality of domains according to the domain label, wherein the loss values relate to an error between the identity score label and the identity scores; and
    updating the appearance signature extractor using the determined loss value.

2. The method of claim 1, further comprising: determining an identity score of the input image for each domain of the plurality of domains.

3. The method of claim 1, wherein the domain label contains information of a location of the input image.

4. The method according to claim 1, further comprising determining an appearance signature for the input image for each of the plurality of domains, and concatenating the determined appearance signatures.

5. The method according to claim 1, wherein determining the loss value comprises using the domain label to select one of a plurality of loss values.

6. The method according to claim 1, wherein determining the loss value comprises determining an inner product of a vector of the domain label and a vector representing a loss value associated with the identity score.

7. The method of claim 1, wherein the domain label contains information relating to acquisition equipment used to capture the input image.

8. The method according to claim 1, wherein the domain label contains information relating to one of place, time, weather environment and event associated with the input image.

9. A non-transitory computer readable medium having a computer program stored thereon to implement a method of training an appearance signature extractor using a training data set, the training data set including input images associated with a plurality of domains, the progam program comprising:
    code for inputting an input image of the training data set, an identity label, and a domain label to the appearance signature extractor, wherein the identity label provides identity information of the input image, and the domain label provides domain information of the input image, the domain information corresponding to one of the plurality of domains;
    code for determining an appearance signature from the input image using the appearance signature extractor;
    code for determining identity scores for the plurality of domains respectively, based on the appearance signature;
    code for determining a loss value from among loss values respectively calculated for the plurality of domains according to the domain label, wherein the loss values relate to an error between the identity label and the identity scores; and
    code for updating the appearance signature extractor using the determined loss value.

10. An apparatus comprising:
    a memory;
    a processor configured to execute code stored on the memory, implementing a method of training an appearance signature extractor using a training data set, the training data set including input images associated with a plurality of domains, the method comprising:

inputting an input image of the training data set, an identity label, and a domain label to the appearance signature extractor, wherein the identity label provides identity information of the input image, and the domain label provides domain information of the input image, the domain information corresponding to one of the plurality of domains;

determining an appearance signature from the input image using the appearance signature extractor;

determining identity scores for the plurality of domains respectively, based on the appearance signature;

determining a loss value from among loss values respectively calculated for the plurality of domains according to the domain label, wherein the loss values relate to an error between the identity label and the identity scores; and updating the appearance signature extractor using the determined loss value.

* * * * *